US005624602A

United States Patent [19]

Lenox et al.

[11] Patent Number: 5,624,602

[45] Date of Patent: Apr. 29, 1997

[54] METHOD OF IMPROVING THE MAINTENANCE OF A FLUORESCENT LAMP CONTAINING TERBIUM-ACTIVATED CERIUM MAGNESIUM ALUMINATE PHOSPHOR

[75] Inventors: Joseph J. Lenox, Towanda; Richard I. Manahan, Dushore, both of Pa.

[73] Assignee: Osram Sylvania Inc., Danvers, Mass.

[21] Appl. No.: 367,671

[22] Filed: Dec. 30, 1994

Related U.S. Application Data

[63] Continuation of Ser. No. 158,806, Nov. 24, 1994, abandoned, which is a continuation of Ser. No. 608,422, Nov. 2, 1990, abandoned, which is a continuation-in-part of Ser. No. 412,039, Sep. 25, 1989, abandoned.

[51] Int. Cl.[6] .......... C09K 11/59; H01J 63/06

[52] U.S. Cl. .......... 252/301.4 F; 427/67; 427/71; 313/486; 313/489

[58] Field of Search .......... 252/301.4 F; 427/67, 427/71; 313/486, 489

[56] References Cited

U.S. PATENT DOCUMENTS

| | | | |
|---|---|---|---|
| 3,856,550 | 12/1974 | Bens et al. | 252/301.4 R |
| 4,096,088 | 6/1978 | Ranby et al. | 252/301.4 R |
| 4,576,833 | 3/1986 | Scholten et al. | 427/67 |
| 4,840,747 | 6/1989 | Fan et al. | 252/301.4 R |
| 5,358,734 | 10/1994 | Lenox et al. | 427/67 |

FOREIGN PATENT DOCUMENTS

| | | | |
|---|---|---|---|
| 58-34887 | 3/1983 | Japan | 252/301.4 R |
| 796092 | 6/1958 | United Kingdom | 427/67 |

*Primary Examiner*—C. Melissa Bonner
*Attorney, Agent, or Firm*—Elizabeth A. Levy; Robert F. Clark

[57] ABSTRACT

The maintenance of a fluorescent lamp containing terbium-activated cerium magnesium aluminate phosphor is improved by combining the phosphor with a small particle size aluminum oxide and wet-milling the phosphor/aluminum oxide mixture before applying the phosphor to the interior of a fluorescent lamp envelope.

2 Claims, 1 Drawing Sheet

32a 38a 42 30 38b 32b 34a 36a 40a 44 46 40b 36b 34b

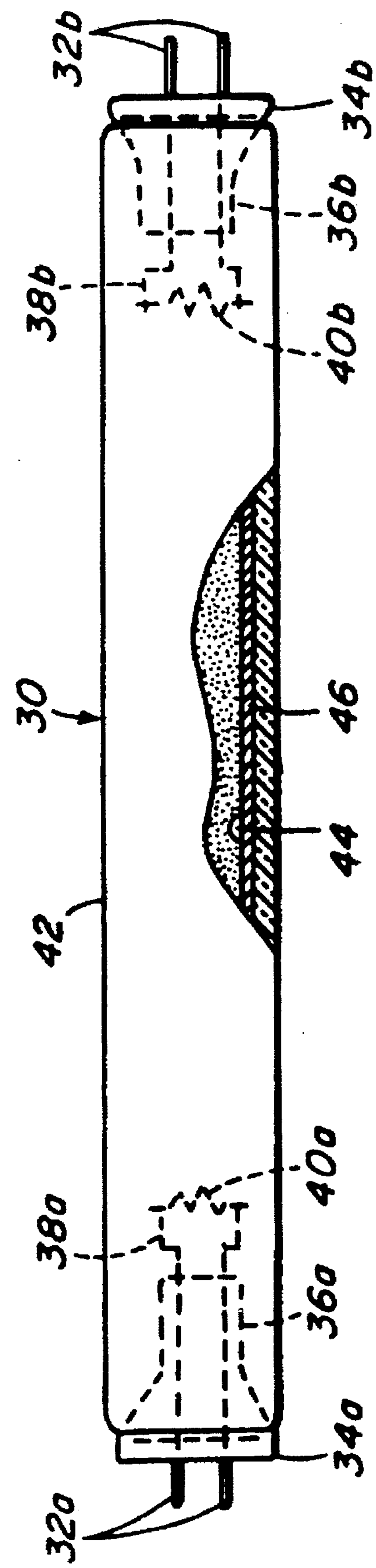
32b
34b
36b
38b
40b
30
46
44
42
40a
38a
36a
34a
32a

METHOD OF IMPROVING THE MAINTENANCE OF A FLUORESCENT LAMP CONTAINING TERBIUM-ACTIVATED CERIUM MAGNESIUM ALUMINATE PHOSPHOR

This application is a continuation of application Ser. No. 08/158,806, filed Nov. 24, 1994, now abandoned, which is a continuation of application Ser. No. 07/608,422, filed Nov. 2, 1990, now abandoned, which is a continuation-in-part of application Ser. No. 07/412,039, filed Sep. 25, 1989, now abandoned.

TECHNICAL FIELD

The invention relates to fluorescent lamp phosphors used in photocopy applications and in multiple layer lamp coating technology.

BACKGROUND ART

Terbium-activated cerium magnesium aluminate phosphors are fluorescent lamp phosphors used in photocopy applications. Such a phosphor has the general formulation $(Ce,Tb)MgAl_{11}O_{19}$ and is described in U.S. Pat. No. 4,840,747 to Fan et al., the disclosure of which is incorporated by reference.

We have found that the maintenance of a lamp containing a terbium-activated cerium magnesium aluminate phosphor can be improved, without adverse effect on the stir-in characteristics of this phosphor, if the phosphor is combined with small particle size aluminum oxide and then wet-milled, prior to its application to the interior of a fluorescent lamp envelope.

SUMMARY OF THE INVENTION

It is an object of the invention to improve the maintenance of a fluorescent lamp containing a terbium-activated cerium magnesium aluminate phosphor.

This object is accomplished by a process for improving the maintenance of a fluorescent lamp containing terbium-activated cerium magnesium aluminate phosphor having the general formulation $(Ce,Tb)MgAl_{11}O_{19}$, comprising the steps of combining a terbium-activated cerium magnesium aluminate phosphor with small particle size aluminum oxide to form a uniform mixture; wet-milling the mixture in a liquid milling medium; wet-screening the mixture to remove particles greater than 25 micrometers in diameter; removing the liquid milling medium from the wet-screened mixture to form a milled phosphor; deagglomerating the milled phosphor to obtain a stir-in terbium-activated cerium magnesium aluminate phosphor; and coating the interior of a fluorescent lamp envelope with the stir-in terbium-activated cerium magnesium aluminate phosphor.

BRIEF DESCRIPTION OF THE DRAWING

FIG. 1 is a drawing of a fluorescent lamp coated with a terbium-activated cerium magnesium aluminate phosphor made by the method of this invention.

DETAILED DESCRIPTION OF THE INVENTION

Various test lots of a terbium-activated cerium magnesium aluminate phosphor, such as Type 2297 (available from the Chemical and Metallurgical Division of GTE Products Corp., Towanda, Pa.) were blended with aluminum oxide C and wet-milled. Lamp performance at 100 hours was measured and compared to a control sample made by the prior art method.

The general formulation of the phosphor is $(Ce,Tb)MgAl_{11}O_{19}$. The phosphor can be prepared by the methods described in U.S. Pat. No. 4,840,747, previously incorporated by reference.

An improvement in 100-hour maintenance is obtained by the use of a terbium-activated cerium magnesium aluminate phosphor which has been wet-milled with a small amount of small particle-size aluminum oxide. Maintenance is defined as the ratio of the 100-hour luminosity to the 0-hour luminosity in a fluorescent lamp.

Aluminum oxide C, available from DeGussa, Inc., having a particle size of 0.02 micrometer, is the preferred source of the small particle size aluminum oxide used in the method of this invention. The amount used is about 0.1% to about 0.4% by weight of the phosphor, with about 0.4% by weight of the phosphor being preferred.

The wet-milling step is carried out with water as the milling liquid. Wet-milling is performed in any type of mill, such as a conventional ball mill or a vibratory mill such as manufactured by SWECO. The amount of water used in the mill is about 0.35 gallon per pound of phosphor. The milling time is not critical but should be long enough to insure that the phosphor will have stir-in characteristics. A milling time of about 15 minutes is typical for a ten-pound charge of phosphor in 3.5 gallons of water.

The wet-milled phosphor is then wet-screened to remove particles greater than 25 micrometers in diameter. The presence of particles larger than 25 micrometers adversely affects the stir-in qualities of the phosphor. The wet-milled phosphor/water slurry containing the aluminum oxide C is passed through a 378 mesh screen to remove these oversize particles.

The milling liquid is then removed from the wet-screened mixture by filtering off the excess liquid. The wet phosphor/aluminum oxide cake that remains on the filter is then dried in a drying oven at about 125° C. to about 180° C. for about 15 to 20 hours.

The dried phosphor/aluminum oxide cake is then blended to insure uniformity.

The blended mixture is then deagglomerated by screening to eliminate or break up any agglomerates formed during the oven-drying stage. A 270 mesh nylon screen is typically used.

The phosphor is now ready to be applied to the interior surface of a fluorescent lamp envelope without further milling in any known manner such as, for example, that described in U.S. Pat. No. 4,307,321 to Pappalardo et al.

FIG. 1 illustrates a fluorescent lamp 30 comprising a transparent, light-transmitting sealed envelope 42, preferably glass. The envelope 42 is fitted at each end with mounts comprising electrodes 40*a* and 40*b*, re-entrant stem presses 36*a* and 36*b* and lead-in conductors 38*a* and 38*b*. Base caps 34*a* and 34*b* and pins 32*a* and 32*b* are provided at each end of the envelope 42, together with a small charge of mercury 44 within the envelope 42.

The inner surface of the envelope 42 is coated with a phosphor layer 46 which includes the terbium-activated cerium magnesium aluminate phosphor made by the method of this invention as described herein.

EXAMPLE I

Deionized water is added to an 18-inch SWECO mill having about 100 pounds of ½-inch aluminum oxide cylindrical grinding media, so that the water level is even with the top of the grinding media. To the mill is added 18 grams of aluminum oxide C and about 10 pounds of terbium-activated cerium magnesium aluminate green phosphor. The mill is run for about 15 minutes. After the milling, the milled slurry is screened through an 18-inch SWECO sieve equipped with a 378 mesh nylon screen and filtered. The filter cake is then oven dried for about 20 hours at about 175° C. in a drying oven. The dry milled phosphor is drum blended and then screened through an 18-inch SWECO sieve equipped with a 270 mesh nylon screen. The resulting phosphor has stir-in characteristics and can be applied without further milling to the interior surface of a fluorescent lamp envelope.

The lamp performance data in Table I indicate that maintenance at 100 hours is improved when the method of this invention is applied to terbium-activated cerium magnesium aluminate phosphors.

TABLE I

| | LAMP PERFORMANCE DATA | | |
|---|---|---|---|
| SAMPLE | 0 HOUR BRIGHT-NESS | 100 HOUR BRIGHT-NESS | MAINTENANCE AT 100 HOURS |
| CONTROL | 4777 L | 4604 L | 96.4% |
| EXAMPLE I | 4792 L | 4672 L | 97.5% |

It is apparent that the method of the present invention produces a terbium-activated cerium magnesium aluminate phosphor having improved maintenance (from 96.4% to 97.5%) without adverse effect on the stir-in characteristics of the phosphor.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for improving the maintenance of a fluorescent lamp containing terbium-activated cerium magnesium aluminate phosphor having the general formulation $CeMgAl_{11}I_{19}$:Tb, comprising the steps of:

a) combining a terbium-activated cerium magnesium aluminate phosphor with small particle size aluminum oxide having a particle size of 0.02 micrometers in an amount of about 0.1% to about 0.4% by weight of said phosphor to form a uniform mixture;

b) wet-milling said mixture in water in an amount of about 0.35 gallon of water per pound of said phosphor for about 15 minutes;

c) wet-screening said mixture to remove particles greater than 25 micrometers in diameter;

d) removing said water from the wet-screened mixture by filtering and drying said wet-screened mixture to form a dry milled phosphor;

e) deagglomerating said dry milled phosphor to obtain a stir-in terbium-activated cerium magnesium aluminate phosphor; and f) coating the interior of a fluorescent lamp envelope with said stir-in terbium-activated cerium magnesium aluminate phosphor.

2. The process of claim 1 wherein said water is removed from said wet-screened mixture by filtering and drying said wet-screened mixture at about 125° C. to about 180° C. for about 15 to about 20 hours.

* * * * *